United States Patent [19]
Borcherds et al.

[11] Patent Number: 5,946,780
[45] Date of Patent: Sep. 7, 1999

[54] MANUFACTURE OF BATH RUFFLES OR SPONGES

[75] Inventors: Cedric M. Borcherds, 11 Lyon Avenue, Turramurra, New South Wales, 2074, Australia; Victor Borcherds, Thermal; Donald Jeffries, Los Angeles, both of Calif.

[73] Assignee: Cedric M. Borcherds, New South Wells, Australia

[21] Appl. No.: 09/019,211

[22] Filed: Feb. 5, 1998

Related U.S. Application Data

[63] Continuation-in-part of application No. 08/695,222, Aug. 6, 1996, Pat. No. 5,766,700.

[51] Int. Cl.⁶ .................................................. D04D 7/06
[52] U.S. Cl. ................................ 28/147; 223/46; 300/21
[58] Field of Search ................... 223/46, 44; 28/147, 28/149, 150; 428/4, 5, 137, 36.1; 15/244.1, 244.4, 208, 209.1, 210.1; 29/446, 452, 235; 300/21

[56] References Cited

U.S. PATENT DOCUMENTS

| | | |
|---|---|---|
| 2,585,781 | 2/1952 | Johnson . |
| 2,666,249 | 1/1954 | Ruiz et al. ................................ 28/150 |
| 2,849,821 | 9/1958 | Doig . |
| 3,336,618 | 8/1967 | Day ............................................ 15/209 |
| 3,816,888 | 6/1974 | Rather, Jr. ................................... 28/147 |
| 3,922,407 | 11/1975 | Nimmo, Jr. et al. . |
| 4,034,443 | 7/1977 | Turner . |
| 4,112,551 | 9/1978 | Sales . |
| 4,454,968 | 6/1984 | StLawrence ............................... 223/46 |
| 4,462,135 | 7/1984 | Sanford ...................................... 15/105 |
| 4,585,676 | 4/1986 | DeSmet et al. . |
| 4,714,182 | 12/1987 | Hecht ......................................... 223/46 |
| 4,840,822 | 6/1989 | Cheng ........................................ 223/46 |
| 5,144,744 | 9/1992 | Campagnoli . |
| 5,295,280 | 3/1994 | Hudson et al. . |
| 5,356,056 | 10/1994 | Teuten ........................................ 223/46 |
| 5,411,188 | 5/1995 | Teuten ........................................ 223/46 |
| 5,709,434 | 1/1998 | Chen .......................................... 300/21 |
| 5,740,599 | 4/1998 | Chang ........................................ 29/446 |

*Primary Examiner*—Amy Vanatta
*Attorney, Agent, or Firm*—Workman, Nydegger & Seeley

[57] ABSTRACT

A method is provided for manufacturing bath ruffles or sponges. The method includes radially stretching over spaced upright supports one or more lengths of resilient extruded polymeric netting tube to form a telescopically gathered continuous band around the supports. A loop securing device is then positioned around opposed portions of the band centrally between the upright supports such that the opposed portions of the band are securely held together. Opposed portions of the telescopically gathered continuous band are then progressively released separately over respective upper ends of the spaced supports to form a generally spherical bath ruffle or sponge.

19 Claims, 5 Drawing Sheets

MANUFACTURE OF BATH RUFFLES OR SPONGES

This application is a Continuation-in-Part of co-pending application Ser. No. 08/695,222 filed Aug. 6, 1996, U.S. Pat. No. 5,766,700 which for purposes of disclosure is incorporated herein by specific reference.

BACKGROUND OF THE INVENTION

1. Field of the Invention

The present invention relates to bath sponges and, more specifically, methods for manufacturing bath ruffles or sponges.

2. Description of the Related Art

In the manufacture of low cost items such as bath ruffles or sponges by unskilled manual labor, it is essential that assembly procedures be standardized and simplified to the extent that labor content is minimized while maintaining complete consistency of product to meet the demands of marketers and retailers.

Typically, imported bath ruffles or sponges are made from extruded polyethylene diamond mesh netting of the type used for fruit or vegetable bags. These bath ruffles or sponges are characterized by a generally misshapen appearance and a prematurely short service life due to unravelling of the ruffle or sponge material from a knotted binding cord.

Consumer demands have lead to the requirement for bath sponges or ruffles to be made in a wide variety of colors and the incorporation of a pigment or dye to the base polymer adds suPit antially to the retail cost of the item.

Moreover, as these bath ruffles or sponges come into intimate contact with tender skin regions of a bather, it is generally not possible to utilize regrind waste polymer due to the risk of contamination which might otherwise manifest itself as sharp lumps or protrusions on the extruded net filaments which could scratch tender skin tissues leading to skin infections.

Even with frequent extruder screen changes to capture particulate contamination, it is extremely difficult to maintain color consistency due to the variations in color in the regrind feedstock without the use of excessive dark pigment to mask the feedstock color variations.

U.S. Pat. No. 4,034,443 is concerned with a knot-tying device in the form of a triangular plate having a small aperture adjacent an apex of the plate and a larger aperture in the center of the plate. A free end of a line or cord is passed through the smaller aperture and knotted on one side of the plate to secure the line or cord thereto. The line or cord is then looped around an object to be secured and a further looped portion of line or cord is pushed through the larger central aperture and looped over the two corners of the plate opposite the apex. Tension on the loop secured around the object secures the knot and the divergent sides of the plate prevent accidental disengagement of the looped portion of line or cord from the plate.

The main application described for this device is to secure a small boat to a mooring post with a tensioned loop.

Another prior art knot tying device is described U.S. Pat. No. 4,112,551 relating to a draw strings puller and fastener for shoes or bags. The draw strings puller and fastener comprises a hollow frusto conical body with the free ends of a loop extending through opposed apertures in the side wall of the hollow body and emerging from a divergent open end thereof. The free ends of the loop are secured in a tapered plug which is inserted into the open end of the body when the loop is tensioned to wedgingly engage the drawstring between the tapered plug and body walls.

Other securing devices for cords or ribbons are described in U.S. Pat. No. 2,585,781, U.S. Pat. No. 2,849,821, U.S. Pat. No. 3,922,407 and U.S. Pat. No. 4,585,676.

U.S. Pat. No. 5,295,280 describes a body scrubber in the form of an elongate body in the nature of chain formed from a plurality of inter-looped links with a loop-like gripping handle at each end. The body portion is comprised of a polymeric netting in a tubular form, typically of Nylon (Trade Mark) or polyethylene.

U.S. Pat. No. 5,144,744 describes a bath ruffle or sponge made from extruded diamond mesh polyethylene of the type used to make fruit and vegetable bags. In this patent, the bath ruffle or sponge is made by stretching a number of netting tubes over respective pairs of spaced upright supports, binding the plurality of tubes together intermediate their ends with a plastic tie strip and then releasing the ends of the tubes from respective supports whereby due to the resiliency of the net material, the tubes rebound to form a sponge shape around the central binding.

Although such prior art bath ruffles or sponges are generally effective for their intended purpose, they do suffer from a number of practical disadvantages.

The use of a plastic tie strip is labor intensive and cannot be secured tightly enough to prevent premature unravelling of the bath ruffle or sponge. To overcome this problem a braided cord of cotton or the like was knotted around the netting tubes but again this was a very labor intensive exercise and was difficult to knot tightly enough to prevent premature unravelling.

Sponges of this type have not found favor due to a misshapen "dog-bone" appearance and a relatively coarse texture which can irritate sensitive skin tissue.

Accordingly, there is a need for a cost-effective manufacturing process for bath ruffles or spotiges from extruded polymeric netting wherein the end product has an aesthetically pleasing appearance, is securely fastened and otherwise which can be adapted to a variety of appearances and functionalities.

The present invention seeks to overcome or ameliorate at least some of the disadvantages associated with prior art bath ruffles or sponges and to provide a greater variety of products.

OBJECTS AND BRIEF SUMMARY OF THE INVENTION

It is an object of the present invention to provide an improved method for the manufacture of bath ruffles or sponges of the type comprising extruded polymeric netting fabric secured by a loop fastener in a generally spherical shape.

It is a further object of the present invention to provide a method for the manufacture of bath ruffles or sponges having more than one texture and/or color.

According to the present invention there is provided a method for the manufacture of bath ruffles or sponges, said method comprising the steps of:

radially stretching over spaced upright supports one or more lengths of resilient extruded polymeric netting tube to form a telescopically gathered continuous band around said supports;

tightly securing over opposed portions of said ban. entrally between said upright supports a loop securing device comprising, in combination, a body having a generally circular base and one or more centrally located apertures therein and a flexible line or cord frictionally engaged within said one or more apertures to form a closed loop extending from said base, the closed loop in use being extendible around said opposed portions of said band with the body and remainder of the flexible line or cord extending through the closed loop to form a double strand loop or cow hitch around the opposed portions of said band whereby the body engages against the looped end of the line or cord to prevent disengagement therebetween; and, progressively releasing separately over respective upper ends of said spaced supports opposed portions of said telescopically gathered continuous band to form a general by spherical bath ruffle or sponge.

Preferably said telescopically gathered continuous band is progressively released by drawing, in opposite directions, opposed portions of said telescopically gathered continuous band over respective upper ends of said spaced supports at an angle acute to a plane between said opposed supports whereby regions of localized stretch are imparted to said netting tube.

If required said one or more lengths of netting tube may comprise at least two tubes telescopically gathered one above the other on said spaced supports.

Suitably said at least two tubes are formed from polymers having differing resiliencies.

Preferably one of said at least two tubes is comprised of a low density polyethylene polymer and the other of said at least two tubes is comprised of a low density polyethylene/ethylene-vinyl-acetate blend or co-polymer.

If required each of said at least two tubes is of a color differing from an adjacently telescopically gathered tube.

Alternatively said one or more lengths of netting may comprise at least two tubes, one of which is axially located within the other.

Suitably where one tube is axially located within another tube each of said one tube and said another tube is of a resilience and/or color differing from the other.

The inner tube may be formed from a netting of differing polymeric composition.

Alternatively the inner tube may be formed from a netting of differing mesh and/or filamentary size.

Preferably the inner tube is formed from a netting having a color darker than an outer tube.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
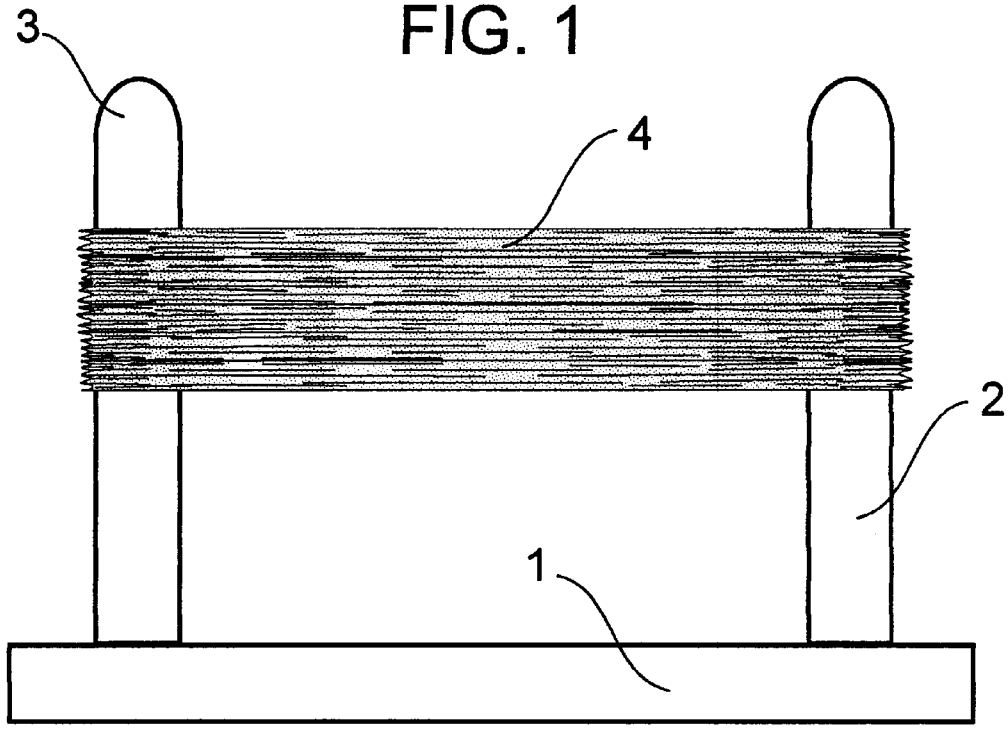
FIG. 1 shows schematically a side elevation of an apparatus used to perform the method of the invention.

In FIG. 1 there is shown an apparatus comprising a base 1 and spaced upright cylindrical support members 2 each having a rounded end 3.

Typically the support members 2 are from about 20 mm–30 mm in diameter and are spaced at about 150 mm to about 250 mm apart.

A length of extruded low density polyethylene diamond mesh tubing is axially stretched at one end over support members 2 and is telescoped in a concertina-like fashion to form a continuous gathered band 4 as shown.

Figure 2:
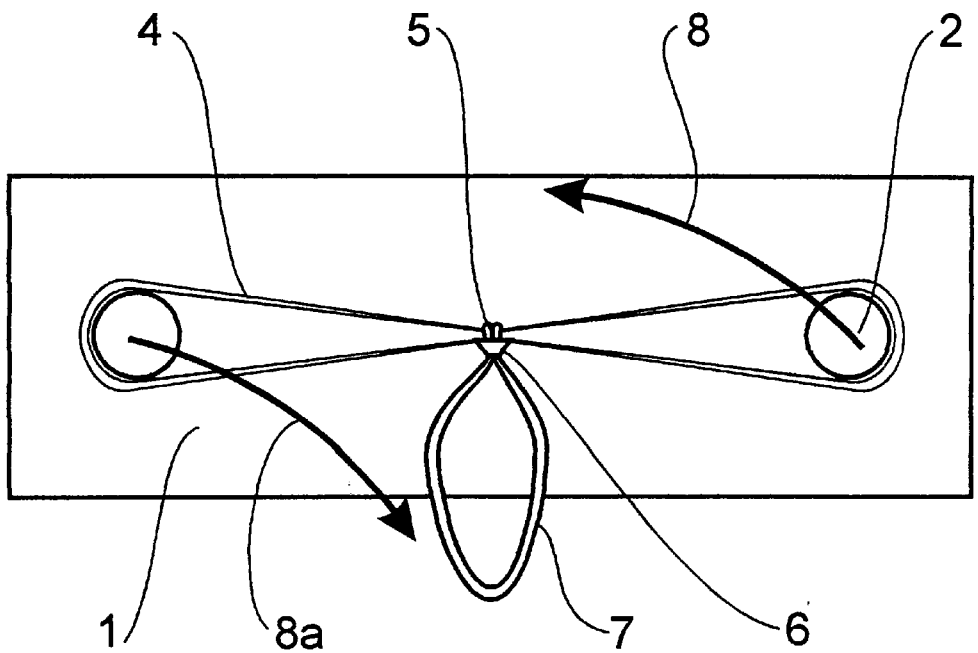
FIG. 2 shows schematically a top plan view of the apparatus of FIG. 1.
Figure 3:
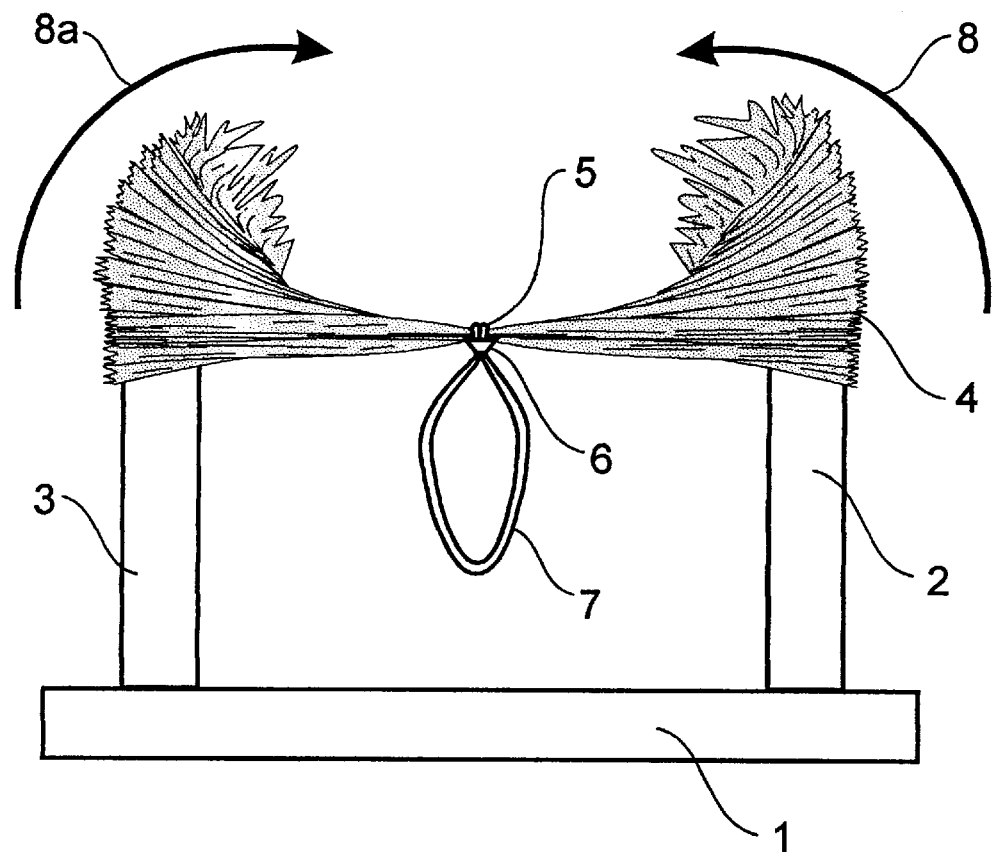
FIG. 3 is a side elevation of the arrangement of FIG. 1 showing the attachment of a loop fastening device according to the invention.

Referring to FIGS. 2 and 3, a loop fastening device 5 as generally described in co-pending patent application 08/695, 222 is secured over the band 4 and tightened by supporting the conical disc body 6 between thumb and forefinger while drawing the free end of loop 7 therethrough.

When the loop fastener 5 is secured, portions of the gathered band 4 are drawing upwardly over the ends 3 of support members 2 in opposite directions at an angle acute to a plane between the upright axes of support members 2 as shown by arrows 8 and 8a. This progressive stretching of selected regions of the mesh tubing followed by resilient relaxation causes a "bulking" of the relaxed mesh in a random manner.

When all of the gathered band has been progressively removed from the support members 2, a substantially spherical bath ruffle or sponge with randomly distributed ruffles or folds in the mesh is formed with a hanging loop 7 firmly secured in the center of the ruffle or sponge body.

The diamond mesh netting may be comprised of low density polyethylene formed by a known process on a known mesh extruder. Typically the diamond mesh may comprise in an unstretched state a tube of about 75 mm in diameter with a mesh aperture of about 6 mm in an axial direction and about 1 mm in a circumferential direction.

The filament size corresponds to a tube mass of about 10 gm/meter and about 5 meters of mesh tubing is employed to obtain a bath ruffle of about 100 mm to 125 mm in diameter and a mass of about 50 gm.

Figure 4:
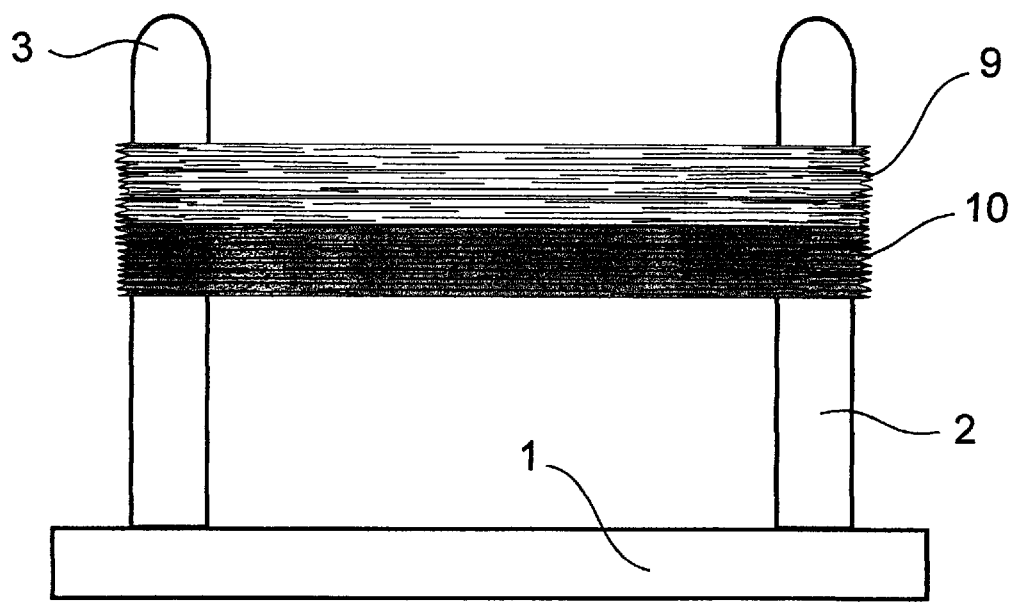
FIG. 4 shows an alternative embodiment of the method.

FIG. 4 shows schematically alternative embodiments of the method according to the invention.

In FIG. 4 separate continuous bands 9, 10 of telescopically concertinered are placed over support members 2, one above the other.

Bands 9, 10 may be formed from differing colors of mesh to achieve a bath ruffle or sponge having differently colored hemispheres for purely aesthetic reasons. It will be apparent to a person skilled in the art that more than two differently colored lengths of mesh may be employed to achieve bath ruffles or sponge with more than two colors.

More importantly however this alternative method is used to form bath ruffles or sponges having opposed hemispheres of differing softness to suit certain delicate skin tissues.

For example, one band 9 may be formed from low density polyethylene mesh and the other band 10 may be formed from EVA (ethylene-vinyl-acetate) polymer or EVA/LDPE mixtures or co-polymers. If required each polymer may be colored differently to indicate differences in softness in each hemisphere of the resultant bath ruffle or sponge.

Figure 5:
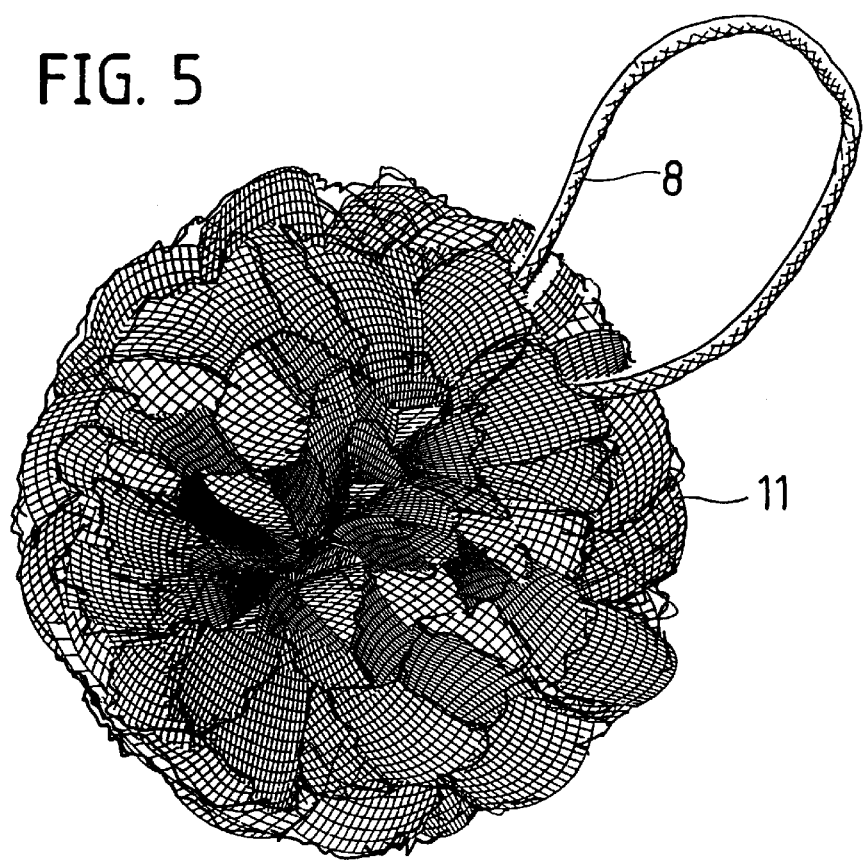
FIG. 5 shows a bath ruffle or sponge made in accordance with the embodiment illustrated in FIG. 4.

FIG. 5 illustrates a bath ruffle or sponge 11 made in accordance with the alternative manufacturing method illustrated in FIG. 4.

Figure 6:
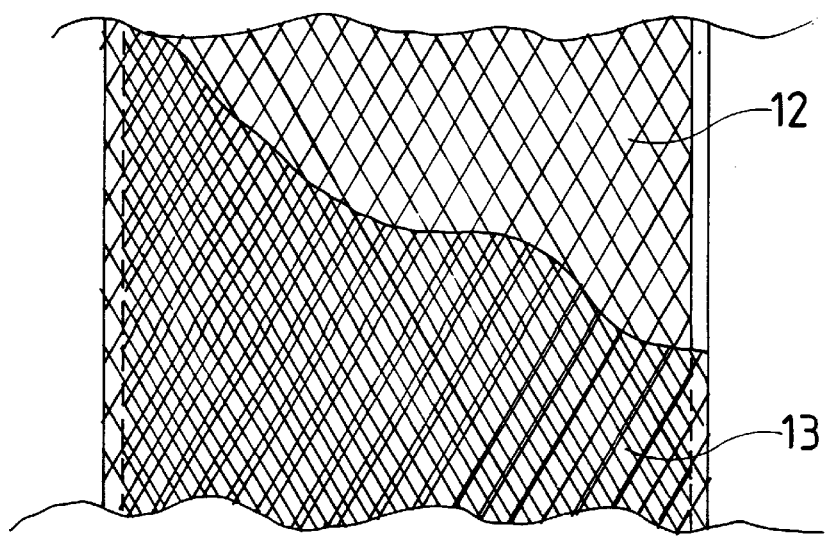
FIG. 6 shows schematically yet another embodiment of the invention.

FIG. 6 shows yet another embodiment of the invention wherein one length of tubular mesh 12 is located inside a second length of tubular mesh 13.

The inner length of mesh 12 simply may be threaded into outer layer 13 or alternatively inner layer 12 may be supported on a mandrel or former (not shown) while the outer layer 13 is drawn thereover.

The double layer of mesh is then drawn onto the supports 2 of the apparatus as shown in FIG. 1 and the bath ruffle or sponge is manufactured as hereinbefore described with reference to FIGS. 1 to 3.

Several advantages accrue from the method employing a double layer of mesh.

The time required to progressively "pluck" the telescopically gathered band of net from the supports 2 is reduced as only 2.5 meters of the double layered mesh is required to achieve a bath ruffle or sponge having the same bulk and mass as one formed from a single mesh tube of 5 meters in length.

By employing a double layer of mesh it is possible to manufacture the inner tube from regrind or second grade, less expensive material and still have a bath ruffle or sponge with the external feel and appearance of a ruffle or sponge made entirely from virgin polymer.

Similarly it is possible to employ an inner tube of, say, less expensive polyethylene to obtain bulk and resilience while the outer cover may be of EVA or EVA modified polymers to provide soft skin contact.

The inner mesh tube may be constructed to a coarse mesh with a relatively large filament diameter while the outer mesh may be finer with a smaller filament diameter.

By careful selection of polymers, mesh size and filament diameter of the inner and outer meshes respectively, substantial variations may be achieved in the "feel" of a bath ruffle or sponge without compromise to cost or user convenience.

Moreover, by utilizing a natural unpigmented, translucent or white pigmented outer mesh over a dark colored inner mesh, color variations normally obvious with the use of pigmented regrind material are much less obvious with the resultant bath ruffle or sponge having a unique "three dimensional" effect.

The loop fastener used in accordance with the manufacturing process comprises a metal or, preferably, a plastics disc with a slotted aperture through which the free ends of a line or cord extend to form closed loops on the opposite side of disc.

The size of the slotted aperture and the line or cord are chosen to permit a slidable frictional engagement between the aperture and the line or cord. Similarly the thickness of disc 1 may be increased if required to provide a greater frictional contact between the aperture wall and the line or cord. Instead of a slotted aperture to accommodate paired strands of line or cord, separate or adjoining apertures may be provided.

Either or both of disc and line or cord may be resiliently deformable to enhance frictional engagement between the inner wall(s) of the aperture(s) and the strands of line or cord.

The line or cord may be chosen from a plastics monofilament which is at least partially resilient in a radial direction. Preferably the line or cord comprises a soft knitted or braided cord made from natural fibers such as cotton or synthetic fibers such as polyethylene, polypropylene or PET (Polyethylene-terephthalate) which is capable of substantial radial compression as it passes through a restricted aperture.

To assist in attaching the line or cord to disc, the aperture may be formed in a frusto-conical shape with an enlarged entry on one side of the disc and a restricted exit on the other side of the disc. The angle formed between the aperture wall and the disc face at the exit is an acute angle providing a relatively sharp edge to enhance frictional engagement with the line or cord, particularly when the plane of the disc is tilted relative to a plane normal with the longitudinal axes of the strands passing through the disc.

The disc may be of any desired shape but preferably is circular to avoid sharp pointed edges which could cause injury when coming into contact with a user. Similarly, the disc may be of any desired diameter but needs only to be of a diameter sufficient to cover the looped end where it engages about the paired strands passing therethrough.

Figure 7:
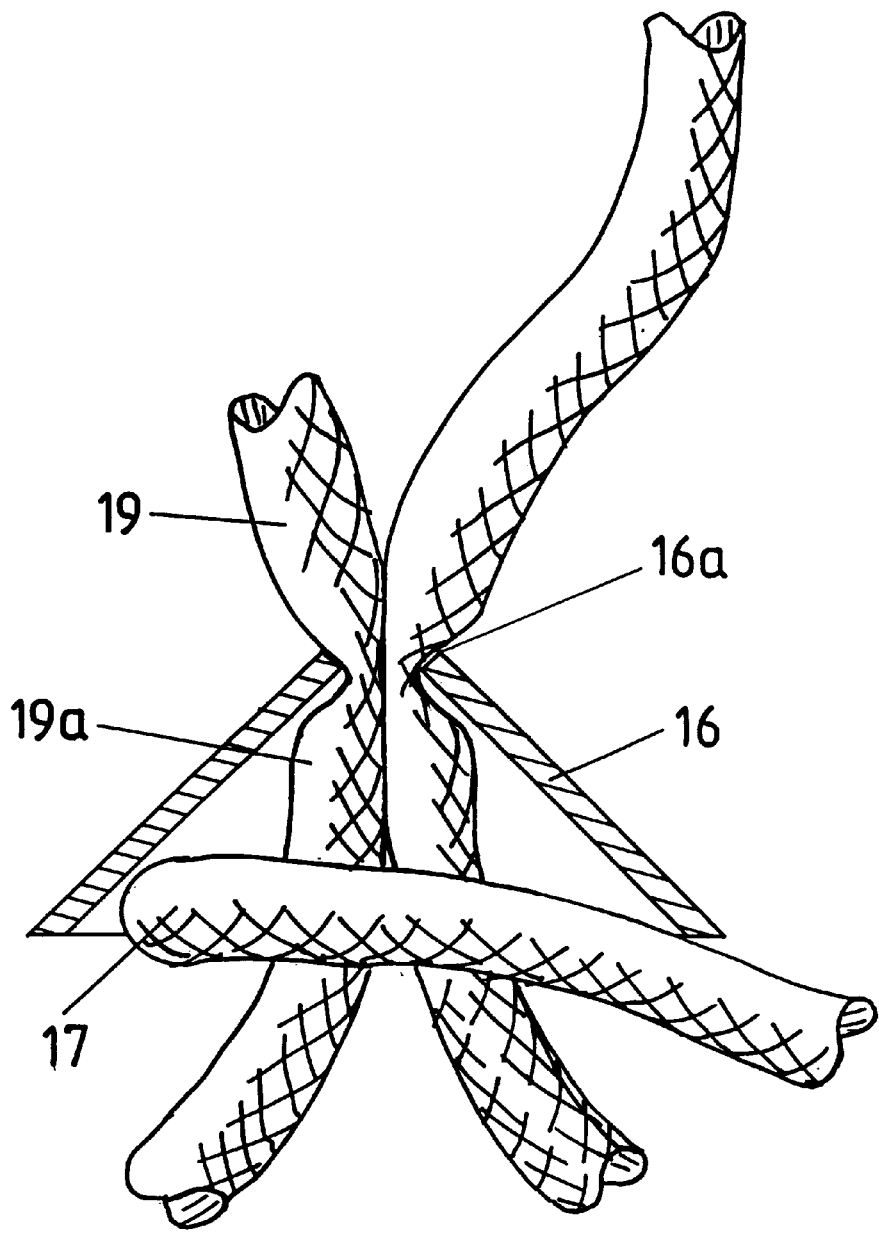
FIG. 7 shows an enlarged partial cross sectional view of a loop fastener employed in the invention.

FIG. 7 shows a particularly preferred form of loop fastener for use with the invention.

In this embodiment the loop fastener comprises a hollow, generally conical wall 6 with a slotted aperture 16a at the apex thereof.

A loop 17 of a radially compressible braided or knitted cord of PET is conveniently inserted through aperture 7 from within the convergently tapering conical wall 6.

For use with bath ruffles or sponges, the free ends 9 of the cord may be knotted to retain the conical member captive or they could be joined together by knotting or fusion welding to form a continuous loop.

As shown in FIG. 7 the looped end 7, as it wraps around paired strands 9a under tension is partially enclosed within the hollow interior of conical member 6 to increase the locking effect of the loop fastener by enhancing the frictional engagement between the loop 17 and the paired strands 19a.

The conical members 16 are conveniently and inexpensively formed by injection molding from a rigid or semi-rigid plastics composition such as nylon, polycarbonate, polystyrene, ABS (acrylonitrilebutadienestyrene) or the like.

Figure 8:
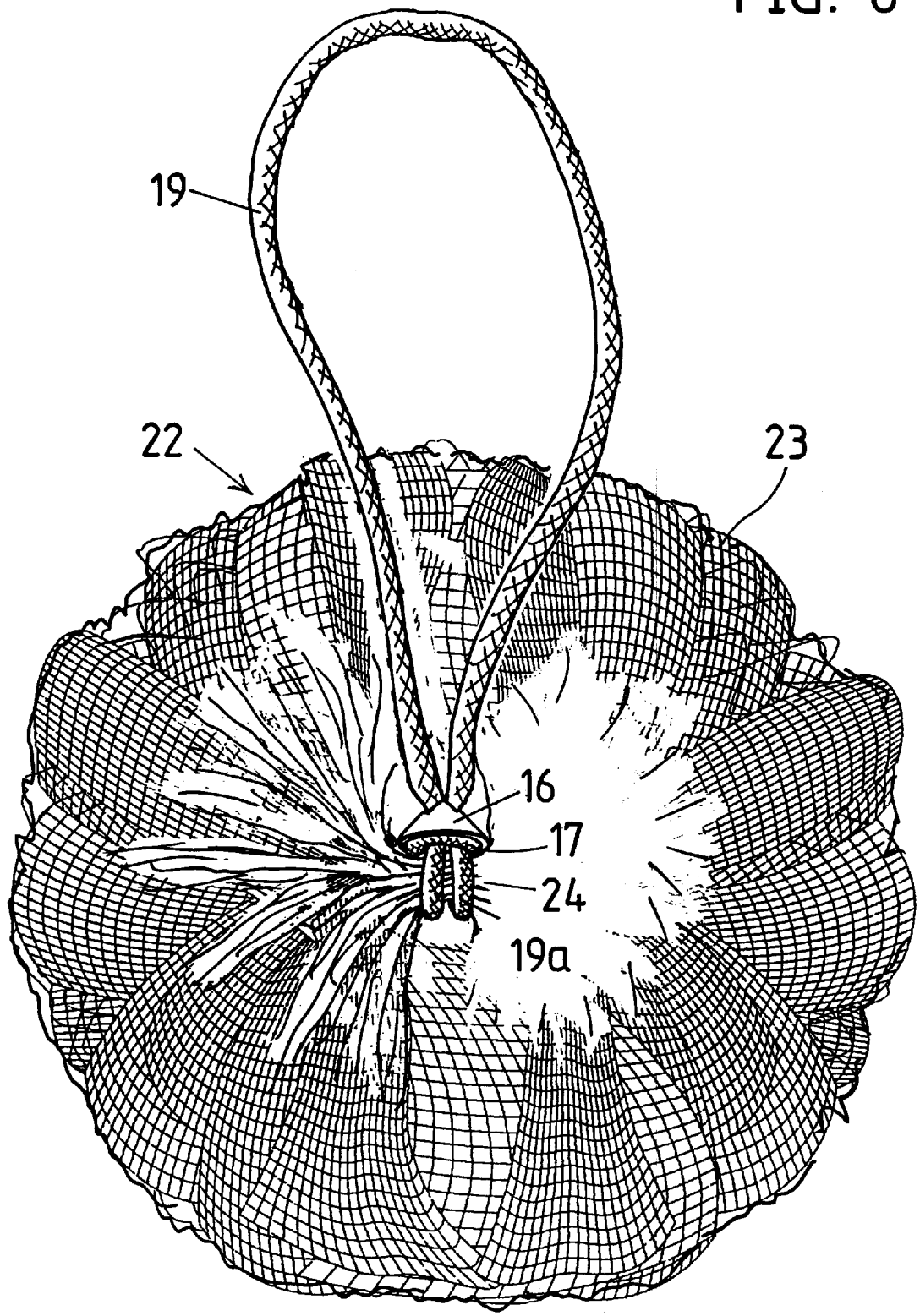
FIG. 8 shows a cut away view of a bath ruffle or sponge made in accordance with the invention.

FIG. 8 shows in partial cross-section of a bath ruffle or bathing sponge 22 for personal hygiene.

Bath ruffle or sponge 22 comprises an extruded net 23 of polyethylene or the like which is formed in accordance with the method hereinbefore described and is secured in one step about its central region 24 by a loop fastener 16 as shown in FIG. 7.

Not only does the loop fastener according to the invention provide a secure, slip free means of securing the bath ruffle or sponge, its configuration is such that there are no protruding edges to cause injury to a bather during use.

The present invention has been shown and described herein in what are considered to be the most practical and preferred embodiments. It is recognized however that departures may be made therefrom within the scope of the invention and that obvious modifications will occur to a person skilled in the art.

For example the body of the loop securing device may be in the form of a spherical shape or an inverted cone wherein the base of the body is at the convergent end of the cone although these embodiments are considered to form a less secure closure than the preferred embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for the manufacture of bath ruffles or sponges, said method comprising the steps of:
   stretching a netting tube over two spaced apart upright supports to form a telescopically gathered continuous band around said supports;
   wrapping a loop end of a cord around opposed portions of said band between said upright supports so as to form a cow hitch around said opposed portions of said band;
   pulling a portion of said cord through an aperture of a loop fastener such that said loop fastener engages against said cow hitch and fictionally locks on said cord, thereby preventing unwanted disengagement of said cow hitch around said opposed portions of said band, and
   progressively releasing over respective upper ends of said spaced supports opposed portions of said telescopically gathered continuous band to form a generally spherical bath ruffle or sponge.

2. A method as claimed in claim 1 wherein said telescopically gathered continuous band is progressively released by drawing, in opposite directions, opposed portions of said telescopically gathered continuous band over respective upper ends of said spaced supports at an angle acute to a plane between said opposed supports whereby regions of localized stretch are imparted to said netting tube.

3. A method as claimed in claim 1 wherein said step of stretching a netting tube over two spaced apart upright supports comprises stretching at least two discrete netting tubes one above the other on said two spaced apart supports.

4. A method as claimed in claim 3 wherein said step of stretching at least two discrete netting tubes over said spaced supports comprises said at least two discrete netting tubes being formed from polymers having differing resiliencies.

5. A method as claimed in claim 4 wherein said step of stretching at least two discrete netting tubes over said spaced supports comprises one of said at least two tubes being comprised of a low density polyethylene polymer and the other of said at least two tubes being comprised of a low density polyethylene/ethylene-vinyl-acetate blend or co-polymer.

6. A method as claimed in claim 3 wherein said step of stretching at least two discrete netting tubes over said spaced supports comprises each of said at least two tubes being of a color differing from an adjacently telescopically gathered tube.

7. A method as claimed in claim 1 wherein said step of stretching a netting tube over two spaced apart upright supports comprises stretching at least two discrete tubes over said upright supports such that one of said tubes is axially located within the other of said tubes.

8. A method as claimed in claim 7 wherein said step of stretching at least two tubes over said upright supports such that one of said tubes is axially located within the other of said tubes comprises one of said tubes being of a resilience differing from the other of said tubes.

9. A method as claimed in claim 7 wherein said step of stretching at least two tubes over said upright supports such that one of said tubes is axially located within the other of said tubes comprises one of said tubes being a color differing from the other of said tubes.

10. A method as claimed in claim 7 wherein said step of stretching at least two tubes over said upright supports such that one of said tubes is axially located within the other of said tubes comprises one of said tubes being formed from a netting of polymeric composition differing from the other of said tubes.

11. A method as claimed in claim 7 wherein said step of stretching at least two tubes over said upright supports such that one of said tubes is axially located within the other of said tubes comprises one of said tubes being formed from a netting of differing mesh than the other of said tubes.

12. A method as claimed in claim 7 wherein said step of stretching at least two tubes over said upright supports such that one of said tubes is axially located within the other of said tubes comprises one of said tubes being formed from a netting of differing filamentary size than the other of said tubes.

13. A method as claimed in claim 7 wherein said step of stretching at least two tubes over said upright supports such that one of said tubes is axially located within the other of said tubes comprises one of said tubes being formed from a netting having a color darker than the other of said tubes.

14. A method for the manufacture of bath ruffles or sponges, said method comprising the steps of:
   radially stretching over spaced upright supports one or more lengths of resilient extruded polymeric netting tube to form a telescopically gathered continuous band around said supports;
   tightly securing a cord over opposed portions of said band centrally between said upright supports such that said opposed portions of said band are securely held together; and
   progressively releasing separately over respective upper ends of said spaced supports opposed portions of said telescopically gathered continuous band to form a generally spherical bath ruffle or sponge, said telescopically gathered continuous band being progressively released by drawing, in opposite directions, opposed portions of said telescopically gathered continuous band over respective upper ends of said spaced supports at an angle acute to a plane between said opposed supports whereby regions of localized stretch are imparted to said netting tube.

15. A method as claimed in claim 14, wherein the step of radially stretching over spaced upright supports one or more lengths of resilient extruded polymeric netting tube comprises stretching at least two discrete netting tubes one above the other on two spaced apart supports.

16. A method for the manufacture of bath ruffles or sponges, said method comprising the steps of:
   radially stretching over spaced upright supports one or more lengths of resilient extruded polymeric netting tube to form a telescopically gathered continuous band around said supports;
   tightly securing over opposed portions of said band centrally between said upright supports a loop securing device comprising, in combination, a body having a generally circular base and one or more centrally located apertures therein and a flexible line or cord fictionally engaged within said one or more apertures to form a closed loop extending from said base, the closed loop in use being extendible around said opposed portions of said band with the body and remainder of the flexible line or cord extending through the closed loop to form a double strand loop around the opposed portions of said band whereby the body engages against a looped end of the line or cord to prevent disengagement therebetween; and progressively releasing separately over respective upper ends of said spaced supports opposed portions of said telescopically gathered continuous band to form a generally spherical bath ruffle or sponge, said telescopically gathered continuous band being progressively released by drawing, in opposite directions, opposed portions of said telescopically gathered continuous band over respective upper ends of said spaced supports at an angle acute to a plane between said opposed supports whereby regions of localized stretch are imparted to said netting tube.

17. A method for the manufacture of bath ruffles or sponges, said method comprising the steps of:

radially stretching over a pair of spaced apart upright supports two discrete netting tubes such that one of said tubes is axially located within the other of said tubes to form a telescopically gathered continuous band around said supports;

tightly securing a cord over opposed portions of said band centrally between said upright supports such that said opposed portions of said band are securely held together; and progressively releasing separately over respective upper ends of said spaced supports opposed portions of said telescopically gathered continuous band to form a generally spherical bath ruffle or sponge.

18. A method as claimed in claim 17 wherein said step of stretching two discrete netting tubes comprises one of said tubes being a color differing from the other of said tubes.

19. A method as claimed in claim 17 wherein said step of stretching two discrete netting tubes comprises one of said tubes being formed from a netting of polymeric composition differing from the other of said tubes.

* * * * *

UNITED STATES PATENT AND TRADEMARK OFFICE
CERTIFICATE OF CORRECTION

PATENT NO. : 5,946,780
DATED : Sep. 7, 1999
INVENTOR(S) : Cedric M. Borcherds; Victor Borcherds; Donald Jeffries It is certified that error appears in the above-identified patent and that said Letters Patent is hereby corrected as shown below:

Col. 1, line 28, after "have" change "lead" to --led--

Col. 1, line 31, after "adds" change "suPit antially" to --substantially--

Col. 1, line 60, after "described" insert --in--

Col. 2, line 34, change "misshapen" to --mis-shapen--

Col. 2, line 37, after "or" change "spotiges" to --sponges--

Col. 2, line 65, after "said" change "ban." to --band--

Col. 2, line 66, before "between" change "entrally" to --centrally--

Col. 3, line 16, before "spherical" change "general by" to --generally--

Col. 5, line 57, change "cnosen" to --chosen--

Col. 7, line 23, after "said" change "band," to --band;--

Signed and Sealed this

Seventeenth Day of October, 2000

Attest:

Q. TODD DICKINSON

*Attesting Officer*  *Director of Patents and Trademarks*